June 10, 1930. W. SHURTLEFF 1,763,104
VARIABLE SPEED A C MOTORS
Filed May 25, 1927
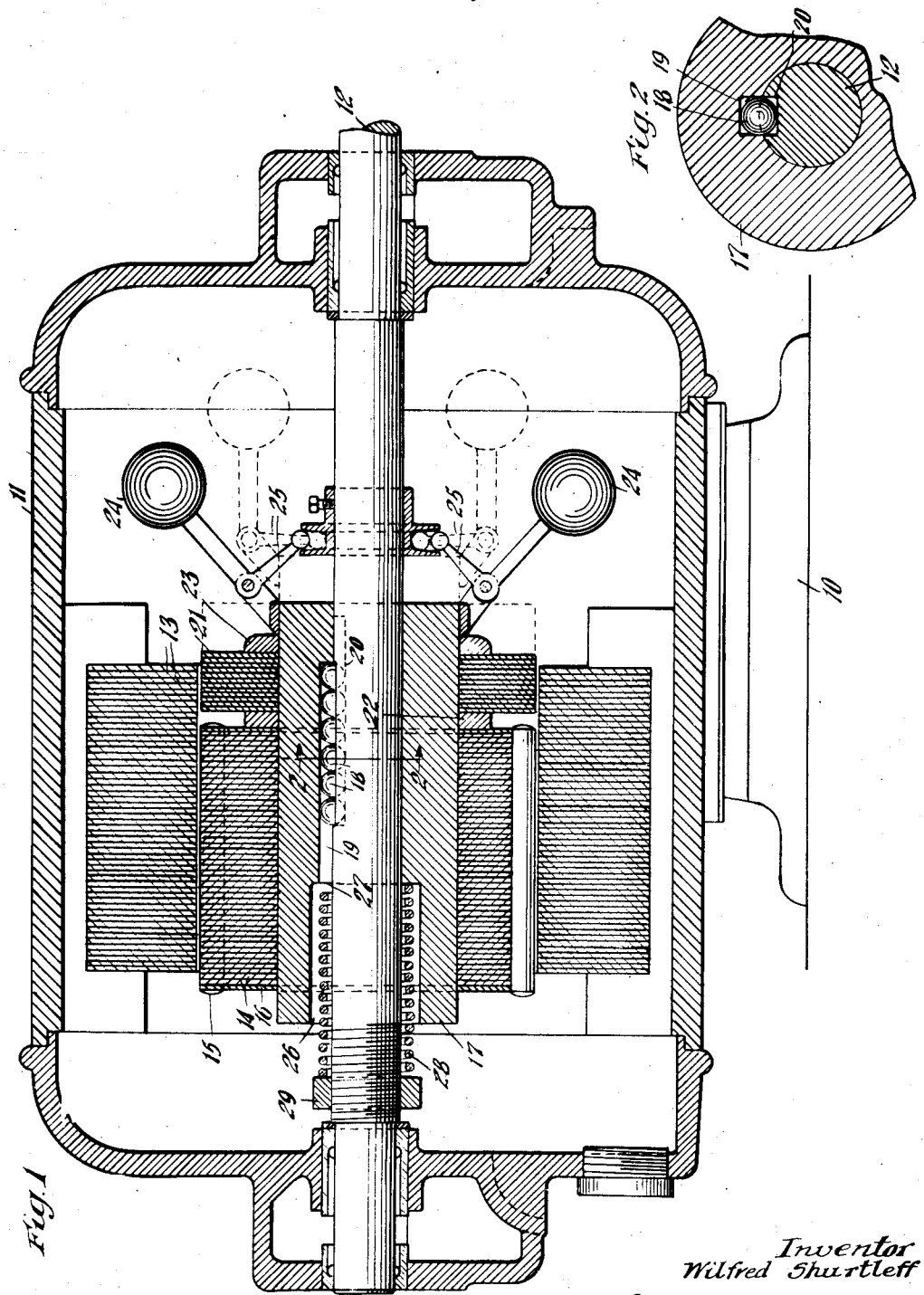
Inventor
Wilfred Shurtleff
By George I Haight
His Atty.

Patented June 10, 1930

1,763,104

UNITED STATES PATENT OFFICE

WILFRED SHURTLEFF, OF MOLINE, ILLINOIS, ASSIGNOR TO THE HERMAN NELSON CORPORATION, OF MOLINE, ILLINOIS, A CORPORATION OF ILLINOIS

VARIABLE-SPEED A C MOTORS

Application filed May 25, 1927. Serial No. 193,992.

This invention relates to improvements in variable speed A. C. motors.

One object of the invention is to provide an efficient, low current consumption A. C. motor, operable at different speeds without excessive heating.

Another object of the invention is to provide an A. C. motor operable at reduced constant speeds under variable loads.

A further object of the invention is to provide an A. C. motor which may be automatically governed to operate at any predetermined speed under variable load conditions.

A still further object of the invention is to provide, in a motor of the type indicated, means requiring both a minimum of current input when starting to thereby minimize flickering of lamps that may be included in the same electric circuit and while the motor is operating to thereby avoid danger of burn-outs and overheating.

Other objects of the invention will more clearly appear from the description and claim hereinafter following.

In the drawing forming a part of this specification, I have shown my improvements as applied to a common type of standard A. C. motor, Figure 1 of the drawing being a vertical, diametrical sectional view of the motor, the full line position of the parts showing the operative running condition and the dotted line position indicating the condition of the parts when the motor is stationary or not running. Figure 2 is a vertical, detail sectional view corresponding to the section line 2—2 of Figure 1 and illustrating the improved ball key connection for the rotor spider sleeve and shaft.

In said drawing, 10 indicates the base of a well known type of A. C. induction motor, on which is secured the casing 11. The end sections of the casing are provided with suitable bearings for the power shaft 12, the latter carrying the rotor as hereinafter described. On the interior of the casing, the customary stator laminations are indicated at 13, any desired suitable winding being used.

The rotor of the motor shown is of the usual squirrel cage type and consists of the stack of laminations 14 and conductors 15, the latter being brazed to end rings 16, as customary. In the particular illustration shown, the rotor laminations are mounted on a spider sleeve 17 which, in turn, is axially slidable relative to the shaft 12 and is kept from turning relative to the latter by the ball key or spline, the details of which are best illustrated in Figure 2. This ball key is obtained by using a plurality of balls 18, which extend partially into a groove 19 formed in the sleeve 17 and partially into a groove 20 formed in the shaft 12. The anti-friction balls 18 are of such number as to occupy only a portion of the whole length of the keyways 19 and 20 so that the balls are free to roll back and forth therein when the sleeve 17 is shifted axially of the shaft, thus providing sliding connection offering a minimum of friction resistance.

In carrying out my invention, I employ a laminated inductance 21 axially separated from the rotor and aligned with the latter, the diameter of the inductance 21 corresponding to the diameter of the rotor. The inductance 21 is held in place on the sleeve 17 by any suitable means such as the clamping plate washers 22 and 23. The washer 22 also serves to separate the inductance from the rotor and to provide an air gap therebetween. By axial shifting of the sleeve 17 which carries the inductance 21, it is apparent that the latter can be moved to positions either entirely outside of the stator laminations or within the latter, as indicated by the dotted line and full line positions in Figure 1 of the drawing.

In the drawing, I have shown automatically governed means for controlling the axial position of the inductance 21 and likewise of the rotor, such means including the pivotally mounted governor weights 24, which are pivotally attached to the sleeve 17 and have operative engagement with the shaft 12 through the intermediary of the arms 25. The sleeve 17, at the end opposite to that from which the governor arms are attached, is recessed as indicated at 26, the bottom of the recess providing a shoulder 27 against which bears a spring 28, the other end of said spring bearing against a nut 29 adjustably mounted on the shaft 12.

When the motor is stationary, the spring 28 expands and forces the sleeve 17 carrying the rotor and the inductance 21 to the right, indicated by the dotted line position of the parts. In this condition, the speed governor weights 24 are in their dotted line position shown. After the motor is started and as the speed increases, the governor arms shift outwardly, overcoming the pressure of the spring 28 and shifting the rotor and inductance 21 axially to the left as viewed in the drawing. By adjusting the nut 29 to vary the tension of the spring 28, it is evident that the axial shift of the rotor and inductance can be regulated to occur at any desired speeds.

As will be evident from the drawing considered in connection with the preceding description, no copper or windings are associated with my laminated inductance. Consequently, when the inductance is inserted between the poles of the stator, the inductance provides the easiest possible path for the magnetic flux from pole to pole, it being observed that the air gaps are or may be as small as those between the rotor and stator. The inductance further acts as a "choke" to reduce the flow of current in the stator windings. Stating the matter in another manner, the inductance affords a "by-pass" for a portion of the magnetic flux and, to the extent of the amount of the flux so by-passed, the conductors or windings of the rotor are not cut thereby. By varying the amount of laminated inductance that is inserted within the stator pole space, it is obvious that the speed of rotation of the rotor can correspondingly be varied; the current input can likewise be controlled both with respect to the starting current input and the running input when the motor reaches the desired speed; and likewise the desired starting torque obtained. By properly arranging the laminated inductance and the length of the stacking of the rotor and the position of the rotor with respect to the stator when starting the motor, the inductance may be entirely outside of the stator stacking or it may be inserted therewithin 1% or 2% or as much more as may be desired. The extent to which the inductance may thereafter be inserted within the stator pole space can be varied as desired. The more the inductance is inserted within the stator when starting the motor, manifestly the less will be the current input. Similarly, the greater the extent to which the laminated inductance is moved within the stator pole space, the lower will be the operating speed of the motor.

The automatic governor arrangement will obviously provide for a lower but constant speed, even under variable loads. When the tension of the spring is set to the desired point, and when the governor balls are thrown out in accordance with the predetermined speed, the maximum insertion of the inductance within the stator pole space, obtains. Should the speed of the rotor become less, the rotor and inductance will thereupon be moved slightly to the right, lessening the amount of inductance within the stator pole space and hence bringing the speed of the rotor back to the predetermined amount for which the governor mechanism is set. As will be obvious to those skilled in the art, the insertion and withdrawal of the inductance may be accomplished in many other ways other than the particular method illustrated in the drawing and hence I do not wish to be confined to the specific arrangement shown except in so far as limited by certain of the claims thereto.

My improvements have been illustrated in connection with a relatively small motor such as commonly used for light duty as in the operation of ventilating fans, and small printing presses which are frequently in circuit with lamps. Great difficulty has heretofore been experienced in obtaining a satisfactory A. C. motor for such use which could be operated at variable speeds without overheating or relatively heavy current losses or heavy initial surging current inputs when started. Many expedients have been suggested to overcome the disadvantages of this type of motor such as the use of brushes, shading coils, choke coils and many other expedients. All former expedients, however, have one disadvantage or another which are entirely overcome by the simple arrangement which I have provided. In those instances where a very wide variation in speeds is desired with a high starting torque such as when operating lathes or elevators, it may be desirable to introduce some resistance in the rotor conductors to thereby increase the torque as will be understood. It will also be appreciated that my improvements are not limited to small size motors although preferably adapted thereto. It will likewise be understood that the improvements are adaptable to motors whether of the single or polyphase type.

Another important feature of my improvements resides in the fact that the cost of a motor embodying my improvements is obviously only slightly in excess of that of a standard motor of the same power and type. Practically the only additional cost necessitated for my improvements is the cost of the laminated inductance which is very small and the provision of slidable movement of the rotor with respect to the shaft. As a matter of fact, my improvements can easily be applied to many standard motors now in service and at comparatively small expense.

Although I have herein shown and described what I now consider the preferred manner of carrying out my invention, the same is merely illustrative and I contemplate all changes and modifications that come within the scope of the claim appended hereto.

I claim:

In a motor of the class described, the combination of a stator, a shaft, a sleeve shiftable endwise on said shaft, said shaft and sleeve having key ways and ball keys therein forming a driving connection between the shaft and sleeve and permitting relative endwise movement of the sleeve, a rotor mounted on and endwise movable with said sleeve relatively to the stator, a choke mounted on said sleeve and spaced from one end of said rotor and comprising a group of laminations movable with said sleeve into and out of the magnetic field of said stator, a spring on said shaft normally urging said sleeve in one direction, means for adjusting the force of the spring, and a centrifugal device responsive to the speed of the rotor for shifting the sleeve, rotor and choke against the action of the spring.

In witness that I claim the foregoing I have hereunto subscribed my name this 18th day of May, 1927.

WILFRED SHURTLEFF.